(12) United States Patent
Wang et al.

(10) Patent No.: US 10,137,668 B2
(45) Date of Patent: Nov. 27, 2018

(54) LAMINATED GLAZINGS WITH IMPROVED MOISTURE PROTECTION

(71) Applicant: Research Frontiers Incorporated, Woodbury, NY (US)

(72) Inventors: Dongyan Wang, Ithaca, NY (US); Seth Van Voorhees, Short Hills, NJ (US); Steven M. Slovak, N. Massapequa, NY (US); Robert L. Saxe, New York, NY (US)

(73) Assignee: RESEARCH FRONTIERS INCORPORATED, Woodbury, NY (US)

( * ) Notice: Subject to any disclaimer, the term of this patent is extended or adjusted under 35 U.S.C. 154(b) by 109 days.

(21) Appl. No.: 15/073,824

(22) Filed: Mar. 18, 2016

(65) Prior Publication Data

US 2016/0282645 A1 Sep. 29, 2016

Related U.S. Application Data

(60) Provisional application No. 62/138,711, filed on Mar. 26, 2015.

(51) Int. Cl.
*B32B 17/10* (2006.01)

(52) U.S. Cl.
CPC .. *B32B 17/10788* (2013.01); *B32B 17/10036* (2013.01); *B32B 17/10302* (2013.01); *B32B 17/10532* (2013.01); *B32B 17/10761* (2013.01)

(58) Field of Classification Search
CPC .............................................. B32B 17/10788
USPC ....................................................... 359/296
See application file for complete search history.

(56) References Cited

U.S. PATENT DOCUMENTS

| | | | |
|---|---|---|---|
| 4,716,184 A | 12/1987 | Kagawa et al. |
| 5,409,734 A | 4/1995 | Lee et al. |
| 5,463,491 A | 10/1995 | Check, III |
| 5,463,492 A | 10/1995 | Check, III |
| 6,301,040 B1 | 10/2001 | Chakrapani et al. |
| 6,416,827 B1 | 7/2002 | Chakrapani et al. |
| 6,900,923 B2 | 5/2005 | Chakrapani et al. |
| 7,033,655 B2 | 4/2006 | Beteille et al. |

(Continued)

OTHER PUBLICATIONS

International Search Report dated Jun. 10, 2016 in corresponding International Application No. PCT/2016/023361.

(Continued)

*Primary Examiner* — James Jones
(74) *Attorney, Agent, or Firm* — Ostrolenk Faber LLP

(57) ABSTRACT

A laminated glazing including a moisture-sensitive functional insert included within the glazing, the laminated glazing comprising a stack comprised of a plurality of glass or plastic plies, the plies being joined together by interlayers located between the plies, wherein a central area of the stack comprises at least one optically clear interlayer; the stack further including a moisture-sensitive functional insert; wherein an inner perimeter of the laminated glazing is formed with a frame comprised of a hydrophobic moisture-resistant material, the frame having a thickness substantially corresponding to a combined thickness of the interlayers within the glazing plus the insert. In addition, a method of reducing or eliminating exposure of a moisture-sensitive insert within a laminated glazing constructed as above is also described herein.

26 Claims, 1 Drawing Sheet

Top View of SPD Lamination with PIB Frame

(56) References Cited

U.S. PATENT DOCUMENTS

| | | | |
|---|---|---|---|
| 7,361,252 B2 | 4/2008 | Slovak et al. | |
| 8,303,436 B2 | 11/2012 | Sullivan et al. | |
| 8,399,098 B2 | 3/2013 | Bennison et al. | |
| 8,670,173 B2 | 3/2014 | Wang et al. | |
| 2002/0126249 A1 | 9/2002 | Liang et al. | |
| 2004/0185195 A1 | 9/2004 | Anderson et al. | |
| 2009/0039901 A1* | 2/2009 | Delatte | B32B 17/10 |
| | | | 324/664 |
| 2009/0181203 A1* | 7/2009 | Valentin | B32B 17/10036 |
| | | | 428/38 |
| 2012/0013969 A1* | 1/2012 | Wang | B32B 17/10036 |
| | | | 359/296 |
| 2012/0236393 A1 | 9/2012 | Slovak et al. | |
| 2014/0320950 A1 | 10/2014 | Saxe et al. | |

OTHER PUBLICATIONS

Written Opinion of the International Searching Authority dated Jun. 10, 2016 in corresponding International Application No. PCT/US2016/023361.

International Preliminary Report on Patentability containing Written Opinion of the International Searching Authority dated Sep. 26, 2017 in corresponding International Application No. PCT/US2016/023361.

* cited by examiner

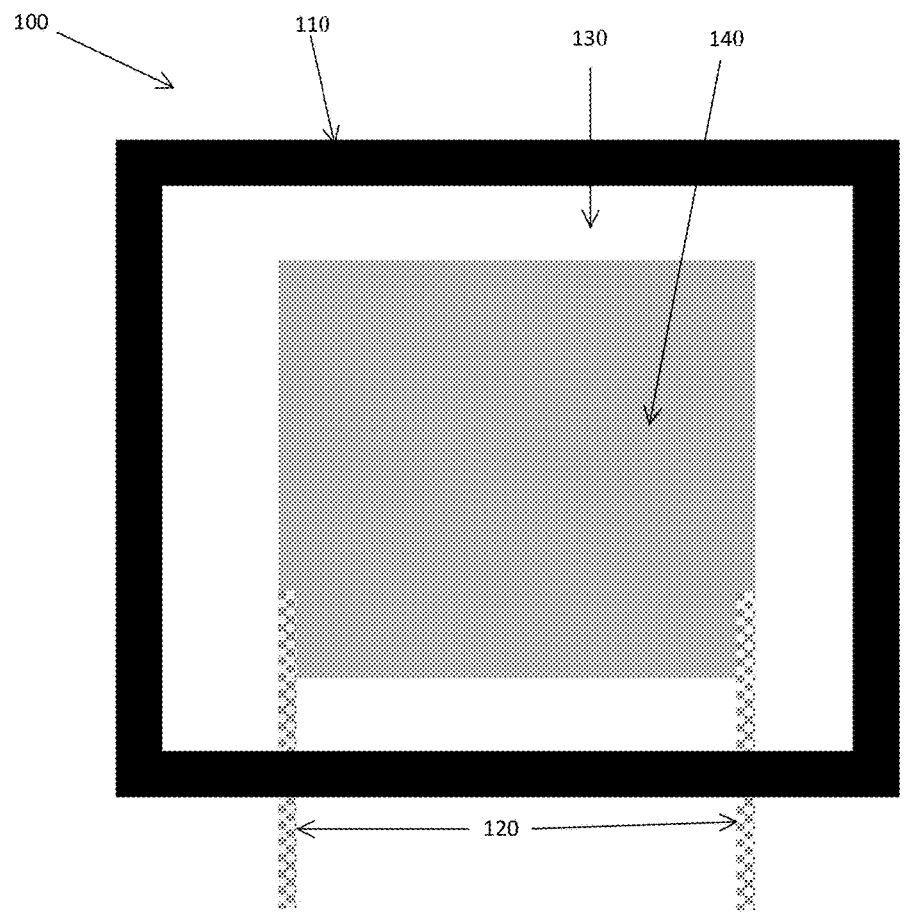
Fig. 1 Top View of SPD Lamination with PIB Frame
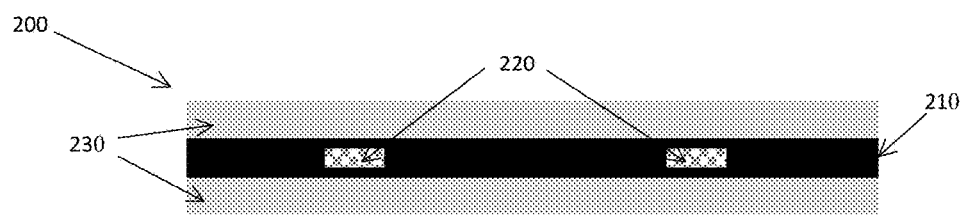
Fig. 2 Side View of Lamination with PIB Frame

LAMINATED GLAZINGS WITH IMPROVED MOISTURE PROTECTION

CROSS-REFERENCE TO RELATED APPLICATION

The present patent application is a nonprovisional and claims the benefit of and priority to U.S. Provisional Patent Application No. 62/138,711 filed on Mar. 26, 2015, entitled "LAMINATED GLAZINGS WITH IMPROVED OPTICAL PROPERTIES," the entire content of which is hereby incorporated by reference herein.

FIELD OF THE INVENTION

The invention is directed to laminated glazings that include moisture sensitive decorative or functional inserts. Such laminated glazings may comprise inserts such as films for use in light valves comprising particle suspensions, which light valves are generally referred to herein as suspended particle devices or SPD light valves, or simply as SPDs. Such laminated glazings may also include other types of light valves such as polymer dispersed liquid crystal (LC), electrochromic, thermochromic or electrophoretic light-controlling materials. The laminated glazings comprise a combination of interlayers wherein the central area of the laminate comprises at least one optically clear interlayer, and the perimeter of the laminate is formed with a frame of hydrophobic moisture-resistant material of similar thickness to the interlayer(s) plus insert within the laminate.

BACKGROUND OF THE INVENTION

Laminated glass is a type of safety glass that holds together when shattered. In the event of breaking, it is held in place by an interlayer, typically of polyvinyl butyral (PVB), polyurethane (PU) or ethylene-vinyl acetate (EVA), between its two or more layers of glass. The interlayer keeps the layers of glass bonded even when broken, and its high strength prevents the glass from breaking up into large sharp pieces. This produces a characteristic "spider web" cracking pattern when the impact is not enough to completely pierce the glass. In the case of thermoset EVA, a cross-linked EVA bonding with the glass is achieved. All of the above interlayers can be used with non-glass substrates, such as polycarbonate, polyacrylic, PET or other types of plastics, to achieve a similar bonding benefit.

Laminated glass is normally used when there is a possibility of human impact or where the glass could fall if shattered and also for architectural applications. Skylight glazing and automobile windshields typically use laminated glass. In geographical areas requiring hurricane-resistant construction, laminated glass is often used in exterior storefronts, curtain walls and windows.

Laminated glass is also used to increase the sound insulation rating of a window, where it significantly improves sound attenuation compared to non-laminated glass panes of the same thickness. For this purpose a special "acoustic PVB" compound is used for the interlayer. In the case of EVA material, no additional acoustic material is required, since EVA provides sound insulation. An additional property of laminated glass for windows is that PVB and EVA interlayer can comprise an ultraviolet (UV) absorber that can block most ultraviolet radiation. For example, a thermoset EVA could block up to 99.9% of the UV rays.

Laminated glazings often have inserts that are laminated between the glass or plastic substrates and clear interlayers to create a decorative or functional laminated glazing. Examples of decorative inserts can be colored plastics, fabric or pictures on paper or silk. Functional inserts include smart technologies such as SPD, as well as LC, photochromic, electrochromic and thermochromic materials.

Light valves have been known for more than eighty years for use in the modulation of light. Such light valves have been utilized in numerous applications during that time including but not limited to, e.g., alphanumeric displays and television displays; filters for lamps, cameras, displays and optical fibers; and windows, sunroofs, toys, sun visors, eyeglasses, goggles, mirrors, rearview mirrors, light pipes and the like to control the amount of light passing therethrough or reflected therefrom as the case may be. Examples of windows include, without limitation, architectural windows for commercial buildings, greenhouses and residences, windows, visors and sunroofs for automotive vehicles, boats, trains, planes and spacecraft, windows for doors including peepholes, and windows for appliances such as ovens and refrigerators including compartments thereof.

As used herein, the term "light valve" describes a cell formed of two walls that are spaced apart by a small distance, with at least one wall being transparent. The walls have electrodes thereon, usually in the form of transparent, electrically conductive coatings. Optionally the electrodes on the walls may have thin transparent dielectric overcoatings thereon. The cell contains a light-modulating element (sometimes herein referred to as an activatable material) which may, without limitation, be either a liquid suspension of particles or alternately, all or a portion of the entire element may comprise a plastic film in which droplets of a liquid suspension of particles are distributed.

The liquid suspension (sometimes herein referred to as a light valve suspension or as a liquid light valve suspension) comprises small particles suspended in a liquid suspending medium. In the absence of an applied electrical field, the particles in the liquid suspension of a SPD light valve may assume random positions due to Brownian movement. Hence, a beam of light passing into the cell is reflected, transmitted or absorbed depending upon the cell structure, the nature and concentration of the particles and the energy content of the light. The SPD light valve using this type of particle movement is thus relatively dark in the OFF state. However, when an electric field is applied through the liquid light valve suspension in the light valve, the particles become aligned and for many suspensions most of the light can pass through the cell. The SPD light valve is thus relatively transparent in the ON state.

For many applications it is preferable for all or part of the activatable material, i.e., the light modulating element, to be a plastic film rather than a liquid suspension. For example, in a light valve used as a variable light transmission window, a plastic film in which droplets of liquid suspension are distributed is preferable to a liquid suspension alone because hydrostatic pressure effects, e.g., bulging associated with a high column of light suspension, can be avoided through use of a film and the risk of possible leakage can also be avoided. Another advantage of using a plastic film is that, in a plastic film, the particles are generally present only within very small droplets and, hence, do not noticeably agglomerate when the film is repeatedly activated with a voltage.

A light valve film (also sometimes herein referred to as an SPD film) as used herein means a film or sheet, or more than one thereof, comprising a suspension of particles used or intended for use in a light valve. Such light valve film usually comprises a discontinuous non-crosslinked phase of liquid comprising dispersed particles, termed a liquid light valve suspension, such discontinuous phase being dispersed throughout a curable continuous phase enclosed within one or more rigid or flexible solid films or sheets. Cured emulsion, which may form part of a light valve film, is sometimes also referred to as a film or film layer. The light valve film and/or a laminated glass stack comprising the light valve film may also comprise one or more additional layers such as, without limitation, a film, coating or sheet or combination thereof, which may provide the light valve film with one or more of, for example, (1) scratch resistance, (2) protection from ultraviolet radiation, (3) reflection of infrared energy, (4) electrical conductivity for transmitting an applied electric or magnetic field to the activatable material, (5) dielectric overcoatings, (6) color tinting, (7) heating elements and/or (8) acoustic control. The additional layers may be adhered to said light valve film with a pressure sensitive adhesive (PSA) known to those skilled in the art or with additional plies of interlayer during the lamination procedure as discussed below in the Summary of the Invention.

A common (but non-limiting) construction for an SPD film comprises five layers, namely, in order from a first side to a second, opposed side: (1) a first sheet of polyethylene terephthalate ("PET") plastic, conveniently 5-7 mils in thickness, (2) a very thin transparent, electrically conductive coating of indium tin oxide ("ITO") or alternative conductive coating, acting or capable of acting as an electrode, on the first sheet of PET, (3) a layer of cured (i.e., cross-linked) SPD emulsion, usually 2-5 mils in thickness and, (4) a second ITO coating (or an alternative conductive coating) acting or capable of acting as an electrode on (5) a second PET plastic substrate. As stated previously, additional layers which provide other functions may optionally be added to the five-layer SPD film described above. Typically, copper foil, conductive fabric or the like are affixed to the electrodes so that they extend beyond the perimeter of the SPD film for convenient busbar connection to a suitable voltage source. Furthermore the SPD film can be laminated, for example, with transparent hot melt adhesive films and/or glass or thicker transparent plastic sheets to provide strength and rigidity and to protect various parts of the combined unit from environmental conditions which may, otherwise, damage its performance characteristics.

U.S. Pat. No. 5,409,734 exemplifies a type of non-crosslinked light valve film that is made by phase separation from a homogeneous solution. Light valve films made by cross-linking (curing) of emulsions are also known. The methods of the present invention are specifically directed to the use of the latter type of film, i.e., film comprising a layer formed by cross-linking an emulsion, and to laminated films produced therewith. See, for example, U.S. Pat. Nos. 5,463,491 and 5,463,492, and U.S. Pat. No. 7,361,252, all of which are assigned to the assignee of the present invention. Various types of SPD emulsions, and methods of curing the same, are described in U.S. Pat. Nos. 6,301,040, 6,416,827, and 6,900,923 B2, all of which are assigned to the assignee of the present invention. A non-limiting example of such a film from Example 5 of U.S. Pat. No. 6,900,923 B2 is produced as follows: 0.002 g of Irgacure 819 (Ciba Specialty Chemicals) photoinitiator ("PI") was dissolved in 2 mL of chloroform and added to 1 g of the matrix polymer described in Example 1. The PI solution was thoroughly mixed with the matrix polymer and the chloroform solvent was removed by placing the mixture inside of a vacuum oven for 30 minutes at 60° C. To this was added 0.62 g of polyiodide crystal paste containing the lauryl methacrylate/HEMA suspending polymer (0.56 g, as synthesized in example 3 of the patent). The resulting mixture was thoroughly mixed and the emulsion obtained was applied onto a conductive coated polyester substrate as a 2 mil thick coating using a doctor blade, mated with a blank conductive coated polyester substrate and cured with ultraviolet radiation (8600 mJ/cm$^2$/min) for 2 min and 30 seconds. Such films and variations thereof may be cured through cross-linking brought about by exposing the films to (1) ultraviolet radiation, (2) electron beams or (3) heat.

All of the patents and patent applications and other references cited in this application are incorporated herein by reference.

DEFICIENCIES OF PRIOR ART SPD LAMINATES

All of the laminated glazings discussed above must be protected from moisture penetrating into the interior of the laminate; especially via the edges of the laminate. For example, US 2002/0126249 A1, "Transmissive or reflective liquid crystal display and novel process for its manufacture", paragraph [0004] notes that " . . . oxygen and moisture, both of which may chemically attack the liquid crystals."

The glass or thick plastic substrates of the laminated glazing will prevent moisture penetration through the opposing faces of the laminated glazing that represent most of the surface of the laminate exposed to the atmosphere. However, moisture permeation through the PVB, EVA or PU interlayer, following prolonged moisture exposure, can result in a cloudy appearance and delamination (separation of the glass or plastic substrate from the interlayer(s)). In the case of laminated glazings with inserts the moisture penetration can also damage the insert and the functional inserts such as SPDs can become visually degraded and/or inoperable.

Prior art SPD films and laminates incorporating such SPD film(s) can develop a pattern at the perimeter of the SPD film where a lighter blue area or "light frame" is visible. The light frame develops when the SPD film or a laminate of the SPD film is exposed to elevated temperature and/or moisture.

As mentioned above, prolonged exposure of SPD film or laminates of SPD film to elevated humidity can cause a light frame to appear. U.S. Pat. No. 7,361,252, assigned to the assignee of the present invention, describes the use of adhesive tape to seal the edges of the SPD film to prevent the hot melt adhesive interlayer material from coming into contact with the cured SPD emulsion and the tape also served as a physical barrier to prevent ingress of, for example, moisture into the interlayer material. However, such tape only possessed modest moisture resistant properties.

Another deficiency of prior art SPD films was the tendency of the cured emulsion to absorb moisture through the exposed edge of the SPD film over time if measures were not taken to isolate the SPD film from sources of such moisture. Subsequent exposure of the SPD film or laminates of the SPD film to moisture could lead to defects such as the light frame and loss of operation mentioned above.

U.S. Pat. No. 8,670,173, assigned to the assignee of the present invention, describes, inter alia, the use of a moisture-resistant barrier located around the entire outer edge portion of the glass or plastic substrates that form the SPD laminate to prevent the formation of a light frame along the perimeter of the SPD film within the laminated glazing. However, the sealants and tape used in the '173 patent were applied to the exterior edge of the laminated glazings which limited the amount of sealant material that could be applied to the relatively small edge surface area and exposed the sealant to damage that could create punctures or voids during handling. Thus, although improved durability was achieved with this method, there is still a need for enhanced prevention of moisture from penetrating through the laminated glazing. These methods, as mentioned above, would also be applicable to any laminated glazing that has to remain optically clear and/or has an insert that needs to be protected from moisture.

The inventors have, therefore, undertaken to develop a methodology for making laminated glazings comprising inserts, such as but not limited to, light valves of the type described herein wherein the occurrence of moisture related issues, such as undesirable light frames, loss of operation and/or the development of a cloudy non-transparent interlayer, is eliminated or substantially reduced.

SUMMARY OF THE INVENTION

The appearance of such light frame(s), hazy appearance and loss of operation is thus eliminated or at least substantially reduced, in a first embodiment, by providing a moisture resistant barrier, of the same or similar thickness as the total thickness of the optically clear interlayers within the laminate plus the insert, around the perimeter of the SPD laminate that creates a frame around the SPD film. Lamination conditions and practices known to those skilled in the art, as well as various configurations of SPD film with multiple plies of interlayer/glass or plastic substrates and the inclusion of additional layers described earlier can be employed in any of the embodiments described herein. A non-limiting summary of the procedure for laminating SPD films in U.S. Pat. No. 7,361,252, assigned to the assignee of the present invention, involves creating a "stack" comprising in sequence a first glass sheet, a first sheet of interlayer, the SPD film comprising cured SPD emulsion sandwiched between two ITO-coated PET substrate sheets with copper foil busbars attached to protrude from said ITO coatings, a second sheet of interlayer and a second glass sheet, all positioned substantially congruent to one another. The stack is placed in a vacuum bag within a Carver Press and a strong vacuum is applied (greater than 29 inches of mercury). The platens of the press are then arranged to touch the outsides of the unlaminated stack and their temperature elevated to affect melting of the interlayers within the stack. The platens are then cooled to solidify the interlayers which adheres the stack into an SPD laminate. The frame of moisture-resistant material in the first embodiment of this invention would be incorporated into the stack beginning at the outer edge of the glass sheets and continuing inward to a position adjacent to the SPD film or insert within the laminate.

In a second embodiment, wherein busbar wires or other suitable electrical leads are required to power the laminated insert (e.g. SPD, LCD, etc.), two layers of said moisture-resistant material are incorporated into the stack as described above. Each of the two layers will have equal dimensions and thicknesses. Additionally, the total thickness of the two layers of moisture-resistant material will be approximately equal to the total thickness of the optically clear interlayers and insert within the lamination stack. The suitable electrical leads will protrude out of the laminate from between the two plies of moisture resistant material to prevent moisture from entering the laminate at the connection site.

In a further embodiment wherein the insert is further laminated to one or more additional films, plies, etc. positioned outwardly from such film, steps are additionally taken to maintain low moisture intrusion by incorporating moisture resistant bonding materials into the lamination stack to form a frame inside the edge of the laminate thus produced. In the above embodiments, although specific brands of moisture resistant bonding material were used in the examples to follow, it should be appreciated that any bonding material comprising hydrophobic materials that repel water and moisture, including, but not limited to, epoxies, polyolefins, ionomers and synthetic rubbers such as isobutylene polymers are suitable for use as the frame of moisture-resistant material for the laminate. It should be noted that other procedures to reduce or eliminate moisture from the lamination stack described in U.S. Pat. No. 8,670,173, assigned to the assignee of the present invention, that include: (1) removing some or all of any trapped moisture from the SPD film; (2) providing a moisture resistant barrier around the SPD film inwardly from the frame and (3) the use of a moisture-resistant barrier located around the entire outer edge portion of the glass or plastic substrates that form the SPD laminate described herein, should also be performed prior to and after the lamination steps described herein.

BRIEF DESCRIPTION OF THE FIGURES

FIG. 1 is a plan view of an SPD laminate according to the present invention wherein a moisture resistant material, of the same or similar thickness as the total thickness of the optically clear interlayers within the laminate, is incorporated into the lamination stack to form a moisture resistant frame; and FIG. 2 is a side view of an SPD laminate according to the present invention illustrating the bus bars of the SPD film within the laminate protruding out of the laminate from between the moisture resistant material.

DETAILED DESCRIPTION OF THE INVENTION

Preliminary tests were performed to determine the effectiveness of polyisobutylene (PIB) at preventing moisture penetration. The PIB utilized for the preliminary tests and the SPD laminates in this invention was HelioSeal PVS 101 obtained from ADCO of Michigan Center, MI. The tests consisted of applying the PIB material along the perimeter of the face of a glass substrate and sandwiching the PIB material with a second glass substrate of identical dimensions. A moisture sensitive indicator strip (Cobalt Chloride indicator paper (3 mm×45 mm strips) obtained from Avogadro Lab Supply, Miller Place, N.Y.) was placed on the interior of the first glass substrate prior to sandwiching the PIB with the second glass substrate (Sample A). Two other samples were prepared in the same manner as described above except that, in one case a copper foil bus bar was positioned starting at the interior and extending outwardly such that it protrudes beyond the second glass substrate prior to sandwiching it with the PIB applied to the first glass substrate (Sample B). In the second case, a PIB layer was applied to both glass substrates and the copper foil busbar was positioned starting at the interior and extending outwardly and over the PIB to protrude beyond the second glass substrate prior to sandwiching the first substrate with the first PIB coated glass substrate (Sample C). All three samples contained a moisture sensitive indicator strip as described above. The three samples were placed in an upper portion of a desiccator that had a reservoir of water in the lower section thereof. A ceramic plate with holes prevented the samples from coming in direct contact with the water in the bottom section of the desiccator. Placing this desiccator in a 60° C. oven creates a high temperature, high humidity environment.

Sample A has been in the 60° C. humidity chamber for 227 days with no color change observed for the highly sensitive indicator strip inside the sample. This shows that no moisture passed into the interior of the sample.

The indicator strip in sample B changed color from blue to white after 5 days in the 60° C. humidity chamber. This showed that moisture had passed through the edge of the sample.

Sample C has been in the 60° C. humidity chamber for 209 days with no color change observed for the highly sensitive indicator strip inside the sample. This shows that no moisture passed into the interior of the sample.

A comparison of the results indicates an effective PIB moisture barrier for sample A is compromised by the configuration of the protruding busbar in sample B.

Since the copper foil busbar of sample B was not covered on both sides by PIB where it protruded outside the sample as in sample C, it is believed that the moisture was able to enter the edge of sample B at the glass-copper foil interface at the perimeter of the sample. Thus, the positioning of the busbar between the two PIB plies in sample C prevented moisture from entering the interior of sample C.

With the above results in mind, a series of SPD laminates incorporating SPD films as the insert were prepared, using the laminating procedures described in U.S. Pat. No. 7,361,252, assigned to the assignee of the present invention. The EVA interlayer used for these laminates was EVAlayer obtained from Interlayer Solutions, Montreal, Canada. All of the prepared SPD laminates incorporated a moisture-sensitive indicator strip into the lamination stack that was positioned adjacent to the SPD film within the laminate. The strips used for these laminations were Humidity Detection strips, 20%-80%, Part #33813-2080 obtained from Indigo Instruments, www.indigo.com.

Thus, as described above, in order to further investigate the effect of moisture on the appearance of a light frame, hazy appearance and loss of operation in SPD films and laminates of SPD films, SPD laminates with different configurations were placed in an upper portion of a desiccator that had a reservoir of water in the lower section thereof. A ceramic plate with holes prevented the SPD laminates from coming in direct contact with the water in the bottom section of the desiccator. Placing this desiccator in a 60° C. oven creates a high temperature, high humidity environment that SPD films and SPD laminates would not normally be exposed to in the field. However, these extreme conditions hazy and 4) the OFF state and ON state transmittances of the SPD film within the laminate.

In configurations wherein tape was affixed around the edges of the SPD film, the tape utilized was Teflon transparent tape with silicone adhesive (McMaster Part #7562A11).

As mentioned above, the SPD film and interlayers that comprise the lamination stack, should be dried as described in U.S. Pat. No. 8,670,173 which is repeated here for completeness. SPD films and interlayers were placed in the upper portion of a desiccator that had a reservoir of desiccant in the bottom section. The interlayers were previously stored in a humidity controlled area where the relative humidity is <25%. The desiccant can be any known type including, but not limited to, silica gel, calcium oxide, calcium sulfate and molecular sieves. A ceramic plate with holes prevented the SPD films and interlayers from coming in direct contact with the desiccant in the bottom section of the desiccator. The dry desiccator containing the SPD films and interlayers was evacuated to a pressure of 0.001 Torr and maintained at this vacuum for 3 days.

The initial ΔT or visible transmittance range (ON state transmittance-OFF state transmittance) of each SPD laminate was measured with The Color Sphere Visible Spectrophotometer, manufactured by Byk-Gardner, by applying an electric field of 100V/60 Hz to the protruding busbars of the laminate to obtain the ON-state transmittance. These optical measurements were repeated periodically during the humidity test.

Digital pictures were taken of each SPD laminate in the OFF and ON transmission states after lamination repeated periodically during the humidity test. The pictures were used to document the onset of a light frame in the SPD film and monitor the moisture strips within the laminate for the presence of moisture within the laminate.

Results and Discussion

Following is a description of the SPD laminates prepared with glass substrates that were tested and Table 1 discloses the results of the 60° C. humidity chamber test.

Test Sample Identification
1. EVA regular lamination
2. EVA lamination with SPD film taped+GS22 Glue Sealant
3. EVA regular lamination+PIB Sealant
4. EVA+PIB frame lamination
5. EVA+PIB frame lamination with SPD film taped
6. EVA+2 ply PIB frame lamination with SPD film taped, Busbars between plies of PIB

TABLE 1

| Laminate # | Moisture Indicated from Strip | Appearance of Light Frame | Cloudy Interlayer Appearance | ΔT change-days and status |
|---|---|---|---|---|
| 1 | 4 days | 26 days | 66 days | −27.33 at 101 days, failed |
| 2 | 4 days | 48 days | 66 days | −5.96 at 80 days, malfunction |
| 3 | 4 days | 58 days | 101 days | −19.81 at 122 days, stopped |
| 4 | None | None | None | −3.9 at 410 days, continuing |
| 5 | None | None | None | −1.37 at 410 days, continuing |
| 6 | None | None | None | −1.62 at 418 days, continuing | were created so that meaningful test results would be obtained in a reasonable period of time. The moisture-saturated desiccator containing the samples was placed in a 60° C. oven and the samples were periodically evaluated for 1) the presence of moisture within the laminate detected by the moisture indicator strips, 2) the formation of a light frame in the SPD film, 3) the change in the appearance of the clear interlayer within the laminate from clear to cloudy/

The column in Table 1 labeled, "Moisture Indicated from Strip" reveals the number of days of sample exposure in the 60° C. humidity chamber that elapsed before the moisture level within the laminate reached 20%. The results show that the laminates with either no sealant (Laminate #1) around the outer edge of the laminate or the use of GS22 Glue (hot melt glue, manufactured by Bostik of Wauwatosa, Wis.) (Laminate #2) or PIB (Laminate #3) as the sealant around the outer edge of the laminate only prevent moisture from entering the laminate for 4 days.

Conversely, Laminates #4-6, which incorporated PIB into the lamination stack to form a frame, have not allowed moisture to enter the laminates for 410, 410 and 418 days respectively and the test continues.

The column in Table 1 labeled, "Appearance of Light Frame", reveals the number of days of sample exposure in the 60° C. humidity chamber that elapsed before degradation in the form of a light frame at the perimeter of the SPD film within the laminate was observed. Once again, the results show that the laminates with either no sealant (Laminate #1) around the outer edge of the laminate or the use of GS22 Glue (Laminate #2) or PIB (Laminate #3) as the sealant around the outer edge of the laminate developed a light frame in the SPD film within 26, 48 and 58 days respectively.

In comparison, Laminates #4-6, which incorporated PIB into the lamination stack to form a frame, have not developed a light frame in the SPD film for 410, 410 and 418 days respectively as the test continues.

The column in Table 1 labeled, "Cloudy Interlayer Appearance" reveals the number of days of sample exposure in the 60° C. humidity chamber that elapsed before the clear EVA interlayer became cloudy. The results show that Laminates #1-3 developed the cloudy appearance after 66, 66 and 101 days respectively. The cloudy appearance was most likely a result of the continued moisture penetration into these laminates that was started after 4 days of sample exposure (see Table 1 and discussion above).

The interlayers of Laminates #4-6 have not developed a cloudy appearance after 410, 410 and 418 days respectively and the test continues. These results are complementary to the moisture and light frame results for Laminates #4-6 in Table 1.

The column in Table 1 labeled, "ΔT change-days and status", lists the change in the visible transmittance range of the SPD film within the laminate from its initial ΔT value to its ΔT value after longer periods of exposure in the 60° C. humidity chamber. These results show that the laminates with either no sealant (Laminate #1) around the outer edge of the laminate or the use of GS22 Glue (Laminate #2) or PIB (Laminate #3) as the sealant around the outer edge of the laminate have significant loss of ΔT. Laminate #1 test was discontinued after 101 days due to the severe loss of ΔT. Laminate #2, which had already lost 5.96 transmittance points after 80 days of exposure, had to be discontinued due to a malfunction in the SPD bus bars that prevented the measurement of ON state transmittance which may have been caused by the penetration of moisture into the laminate. However, it is believed that had the test continued, based on the poor results regarding moisture penetration into the laminate and development of the light frame in the SPD film, the ΔT would have continued to decrease. Laminate #3 has lost 19.81 transmittance points after 122 days of exposure and the test was stopped due to significant loss of ΔT, similar to Laminate #2 the poor results regarding moisture penetration into the laminate and development of the light frame in the SPD film, indicates that the ΔT would have continued to decrease.

Laminate #4 has lost 3.90 transmittance points after 410 days of exposure and the test continues. Laminates #5-6 have only lost 1.37 and 1.62 transmittance points after 410 and 418 days of exposure respectively and the test continues. Laminate #5 is analogous to sample B of the preliminary test above wherein the copper foil bus bar is adjacent to a glass substrate and Laminate #6 is analogous to sample C of the preliminary test wherein the copper foil bus bar is sandwiched between two plies of PIB. Therefore, as the test continues it is expected that Laminate #6 will maintain its moisture resistant properties longer than Laminate #5.

Therefore, the results of the 60° C. humidity chamber for Laminates #4-5 demonstrated the first embodiment of this invention wherein a frame of moisture-resistant material is incorporated into the stack beginning at the outer edge of the glass sheets and continuing inwardly to a position adjacent to the clear interlayer or the SPD film or insert within the laminate.

Furthermore, the results of the 60° C. humidity chamber for Laminate #6 and sample C of the preliminary 60° C. humidity chamber test demonstrate the preferred second embodiment of the invention wherein two plies of moisture resistant material are combined to form a frame of moisture-resistant material that is incorporated into the stack beginning at the outer edge of the glass sheets and continuing inward to a position adjacent to the clear interlayer or the SPD film or insert within the laminate.

The suitable electrical leads will protrude out of the laminate from between the two plies of moisture resistant material to prevent moisture from entering the laminate at the connection site.

As mentioned above, epoxies, polyolefins and ionomers are also suitable for use as the frame of moisture-resistant material for the laminate. For example, U.S. Pat. No. 8,303,436 B2 discloses a golf ball having a moisture barrier layer made from polyolefin compositions. (Column 2, line 3-4) "The moisture vapor barrier layer encapsulates the core to protect it from the negative effects of moisture." (Column 1, lines 10-11) " . . . wherein the moisture barrier layer is preferably made from a non-ionomeric polyolefin composition." U.S. Pat. No. 4,716,184 discloses an epoxy resin encapsulating composition with enhanced moisture resistance. (Column 1, lines 34-36) " . . . or on utilizing the epoxy resin encapsulating composition which has an enhanced moisture resistance which remains intact . . . ", (Column 2, lines 67-68 to column 3, lines 1-2) "Accordingly, it is a primary object of the present invention to provide an epoxy resin encapsulating composition with enhanced moisture resistance for semiconductor packages . . . ". Finally, U.S. Pat. No. 8,399,098 B2 discloses laminates comprising ionomer interlayers with low haze and high moisture resistance. (Column 2, lines 14-17) " . . . to develop an ionomer composition that is useful in safety laminates and that is capable of retaining good optical properties and good moisture resistance . . . ".

The figures contained in this application are provided to illustrate several possible constructions of SPD laminates produced according to the invention. They should not be construed as limiting the invention, however, as numerous alternate arrangements, i.e., optionally utilizing a variety of different materials well known among those familiar with the SPD art, will readily suggest themselves to those having at least an ordinary level of skill in this field.

As indicated above, FIG. 1 provides a plan, i.e., overhead, view of an SPD laminate (100) constituting in one possible non-limiting embodiment, an SPD film (140) with bus bars (120) attached to and protruding outward from SPD laminate (100). SPD film (140) with bus bars (120) is sandwiched between two or more clear interlayers (130) all laminated within two glass or plastic substrates (not shown). Moisture-resistant material (110) is also laminated within the two glass or plastic substrates (not shown) and adjacent to said clear interlayer (130) to form a frame inside SPD laminate (100).

FIG. 2 provides a side view of an SPD laminate (200) comprising the moisture resistant frame (210) sandwiched between two glass or plastic substrates (230). Bus bars (220) are shown protruding out from between said moisture resistant material (210).

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A laminated glazing including a moisture-sensitive functional insert included within said glazing, said laminated glazing comprising:
    a stack comprised of a plurality of glass or plastic plies, said plies joined together by interlayers located between said plies, wherein a central area of said stack comprises at least one optically clear interlayer,
    said stack further including therein a moisture-sensitive functional insert, wherein the moisture-sensitive functional insert is a light valve selected from the group consisting of a suspended particle device, a film of polymer-dispersed liquid crystal, an electrochromic light-controlling material, a thermochromic light controlling material and an electrophoretic light-controlling material,
    and wherein an inner perimeter of the laminated glazing is formed with a frame comprised of a hydrophobic moisture-resistant material, said frame having a thickness substantially corresponding to a combined thickness of the interlayers within said glazing plus the insert.

2. The laminated glazing according to claim 1, wherein the frame is formed of a material selected from the group consisting of polyolefins, ionomers and synthetic rubbers.

3. The laminated glazing according to claim 2, wherein the frame is formed of polyisobutylene.

4. The laminated glazing according to claim 1, wherein the moisture-sensitive insert is a suspended particle device, and wherein the suspended particle device comprises a cell formed of two spaced apart walls wherein one said wall is transparent, each said wall having an electrode on an inner surface thereof, and a light modulating element located within said cell between the cell walls.

5. The laminated glazing according to claim 4, wherein the light modulating element comprises a liquid suspension of particles or a plastic film in which droplets of liquid suspension are distributed.

6. The laminated glazing according to claim 5, wherein said film comprises at least one film or sheet comprising a discontinuous non-crosslinked phase of liquid comprising dispersed particles, such discontinuous phase being dispersed throughout a curable continuous phase enclosed within one or more rigid or flexible solid films or sheets.

7. The laminated glazing according to claim 6, wherein said film comprises one or more additional layers positioned outwardly thereon, wherein said additional layer(s) comprise a film, coating, sheet or combination thereof capable of providing to said suspended particle device at least one property selected from the group consisting of scratch resistance, protection from ultraviolet radiation, reflection of infrared energy, electrical conductivity for transmitting an applied electric or magnetic field to the light modulating element, dielectric overcoatings, color tinting, heating and acoustic control.

8. The laminated glazing according to claim 4, wherein one or more conductive elements are affixed to the electrodes such that the conductive elements extend beyond a perimeter of the film to permit connection thereof to a suitable voltage source.

9. The laminated glazing according to claim 4, wherein the suspended particle device is laminated with transparent hot melt adhesive film and/or glass or thicker transparent plastic sheets to provide additional strength and rigidity to the suspended particle device, as well as protection from environmental conditions which may, otherwise, damage the performance characteristics of the suspended particle device.

10. The laminated glazing according to claim 5, wherein the film is cured through cross-linking obtained by exposing an uncrosslinked film to an energy source selected from ultraviolet radiation, electron beams and heat.

11. The laminated glazing according to claim 1, wherein the interlayer is formed from a material selected from the group consisting of polyvinyl butyral, polyurethane and ethylene-vinyl acetate.

12. The laminated glazing according to claim 11, wherein the interlayer is formed of ethylene-vinyl acetate (EVA) and wherein the EVA is thermoset EVA.

13. The laminated glazing according to claim 11, wherein the interlayer is formed of polyvinyl butyral (PVB) and wherein the PVB is acoustic PVB.

14. The laminated glazing according to claim 1, wherein at least one said ply is a plastic ply.

15. The laminated glazing according to claim 1, wherein said plastic is polycarbonate, polyacrylic or poly-ethylene terephthalate.

16. The laminated glazing according to claim 4, further comprising one or more conductive elements affixed to the electrodes such that the conductive element(s) extend beyond a perimeter of the film to permit connection of said film to a suitable voltage source, and wherein said frame is formed of two plies of said hydrophobic moisture-resistant material, a total thickness of said two plies being substantially equal to a total thickness of optically clear layers plus insert within said stack, wherein the conductive elements protrude out of the laminate between the two plies of hydrophobic moisture-resistant material.

17. A method for eliminating or at least reducing exposure of a moisture-sensitive functional insert located within a laminated glazing to moisture from outside the glazing, said method comprising providing along an inner perimeter of said glazing a frame comprised of hydrophobic moisture-resistant material, said frame having a thickness substantially corresponding to a combined thickness of interlayer(s) and a moisture-sensitive insert located within said laminated glazing, and wherein the moisture-sensitive insert is a light valve selected from the group consisting of a suspended particle device, a film of polymer-dispersed liquid crystal, an electrochromic light-controlling material, a thermochromic light-controlling material and an electrophoretic light-controlling material.

18. The laminated glazing according to claim 17, wherein the frame is formed of a material selected from the group consisting of polyolefins, ionomers and synthetic rubbers.

19. The laminated glazing according to claim 18, wherein the frame is formed of polyisobutylene.

20. The method according to claim 18, wherein the hydrophobic moisture-resistant material is polyisobutylene.

21. The method according to claim 17 wherein the moisture-sensitive insert is a suspended particle device (SPD) and the frame is comprised of two plies of said hydrophobic moisture-resistant material, and wherein electrical leads for connecting the suspended particle device to a voltage source extend from the suspended particle device out of the laminated glazing between said two plies.

22. The method according to claim 21, wherein both said plies of hydrophobic moisture-resistant material are formed of polyisobutylene.

23. The method according to claim 17 wherein the moisture-sensitive insert is a suspended particle device (SPD), and which further comprises providing a moisture-resistant barrier around a film within the SPD, said barrier located inwardly from said frame.

24. The method according to claim 23, wherein the moisture-resistant barrier is comprised of at least one hydrophobic material that repels water and moisture.

25. The method according to claim 24, wherein the moisture-resistant barrier is formed of a material selected from the group consisting of ethylene vinyl acetate, polyvinyl butyral and polyurethane.

26. The method according to claim 17, wherein the moisture-sensitive insert is a suspended particle device (SPD), and wherein the method further comprises removing at least some trapped moisture from a film of the SPD prior to laminating said glazing.

* * * * *